Figure 1:
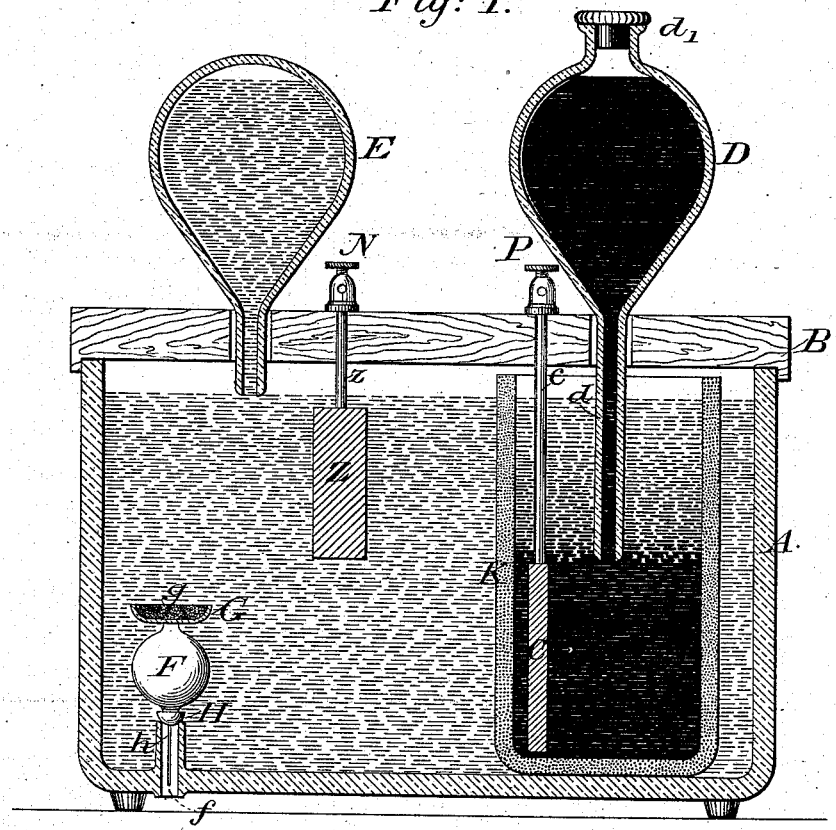

(No Model.) 2 Sheets—Sheet 1.

F. L. POPE.
AUTOMATIC FEEDING APPARATUS FOR VOLTAIC BATTERIES.

No. 293,272. Patented Feb. 12, 1884.

Witnesses:
Daniel W. Edgcomb
Carrie E. Ashley

Inventor:
Frank L. Pope,
by his Attorneys
Pope Edgcomb & Butler (No Model.)  2 Sheets—Sheet 2.
F. L. POPE.
AUTOMATIC FEEDING APPARATUS FOR VOLTAIC BATTERIES.
No. 293,272. Patented Feb. 12, 1884.
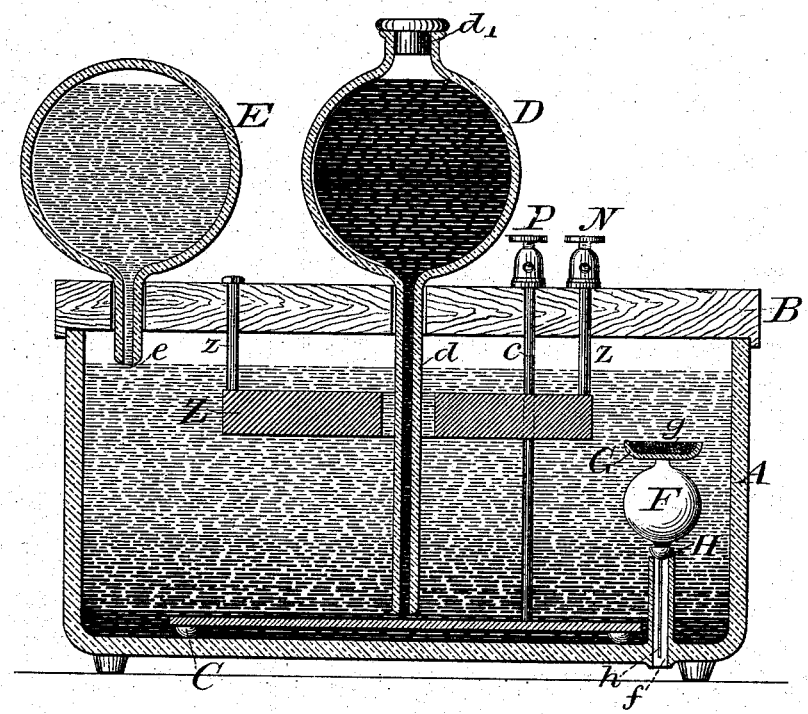
Fig: 2.
Witnesses:
Daniel W. Edgcomb
Carrie E. Ashley
Inventor:
Frank L. Pope,
by his Attorneys
Pope Edgcomb & Butler

UNITED STATES PATENT OFFICE.

FRANK L. POPE, OF ELIZABETH, NEW JERSEY.

AUTOMATIC FEEDING APPARATUS FOR VOLTAIC BATTERIES.

SPECIFICATION forming part of Letters Patent No. 293,272, dated February 12, 1884.

Application filed February 14, 1883. (No model.)

*To all whom it may concern:*

Be it known that I, FRANK L. POPE, a citizen of the United States, and a resident of Elizabeth, in the county of Union and State of New Jersey, have invented certain new and useful Improvements in Automatic Feeding Apparatus for Voltaic Batteries, of which the following is a specification.

My invention is designed more particularly for use in connection with that class of voltaic batteries in which the exciting agent is an aqueous solution of sulphate of copper; but it may nevertheless be employed with advantage in connection with any voltaic combination in which the positive and negative elements are respectively immersed in different liquid solutions of normally unequal specific gravities, or of which the specific gravities tend to become unequal by the action of the battery.

The object of the invention is to insure a continuous supply of the exciting solution and a continuous removal of the liquid waste product formed by the action of the battery, whereby the respective positive and negative solutions may be maintained at or near their normal and proper specific gravities, thus rendering it possible to maintain such a battery in continuous and uniform action for a long period of time.

I have hereinafter described my invention as applied to the well-known Daniell battery, in which the zinc or positive element is immersed in a semi-saturated solution of sulphate of zinc in water, and the copper or negative element in a saturated solution of sulphate of copper in water, and some suitable means are employed to keep these two solutions separated from each other—a result which in some cases is effected by means of a porous cell or diaphragm of unglazed porcelain or other like material, and in other cases by superposing the solution of lesser specific gravity upon the solution of greater specific gravity. When the battery is set in action, the metallic copper contained in the sulphate-of-copper solution is precipitated upon the negative plate; and this solution consequently tends to become less and less dense—that is to say, its normal specific gravity tends to diminish. On the other hand, the density of the sulphate-of-zinc solution constantly increases so long as the battery continues in action. Hence, in order to maintain both solutions in their normal condition, it is necessary from time to time to remove a portion of the sulphate-of-zinc solution and replace the same with a like volume of water, and also to supply a saturated solution of sulphate of copper in place of that which has been partially reduced by the action of the battery.

In carrying out my invention I place the battery in communication with two reservoirs, one containing a supply of water for diluting the sulphate-of-zinc solution, and the other containing a supply of sulphate of copper for restoring the sulphate-of-copper solution. I also provide a suitable conduit, the uppermost inlet or opening of which is closed by a valve automatically opened and closed by the action of a weighted float, which float, when the specific gravity of the sulphate-of-zinc solution exceeds a certain predetermined point, raises the valve, and withdraws a portion of the solution from the vessel, which is at once automatically replaced by the descent of an equivalent volume of water from the water-reservoir. By this means the electro-motive force and the internal resistance of the battery, and consequently the current generated thereby, are kept absolutely uniform for any required length of time.

In the accompanying drawings, Figure 1 illustrates my invention applied to a well-known form of the Daniell battery; and Fig. 2 illustrates the same as applied to a modification thereof, best known as the "gravity-battery."

Referring to Fig. 1, A represents a containing-vessel, which may be made of glass, porcelain, or other like or suitable material for the purpose, to which is preferably fitted a wooden cover, B, whereby the contents are kept clean and evaporation prevented. This cover may also serve as a convenient support for sustaining the plate or plates of the battery, as well as the reservoirs for containing supplies of material for the battery, as hereinafter set forth.

Z represents the zinc or positive element or plate of the battery, which may be of any convenient form or dimensions. It is preferably suspended in the upper part of the containing-vessel A by means of a rod, $z$, which terminates in a binding-screw, N, to which the conducting-wire or electrode may be attached. The copper or negative element C is attached in like manner to a rod, $c$, terminating in a binding-screw, P. The copper plate is preferably placed in the lower portion of a porous cup or cell, K, of unglazed porcelain or other like material, which is placed within the containing-vessel A.

When the battery is to be set in action, the porous cell K is filled with a strong solution of sulphate of copper, and the outer containing-cell, A, either with pure water or with water containing a quantity of sulphate of zinc in solution. Both the containing-vessel and the porous cell should be filled nearly to the top, as shown in the figure. As soon as the opposite poles of the battery are joined, which is effected by uniting the binding-screws P and N by means of an exterior conductor of greater or less length, metallic copper is deposited upon the negative plate C from the solution surrounding it, and sulphate of zinc is formed by the decomposition of the positive plate Z in the outer or containing vessel, which is dissolved as fast as formed by the water in which it is immersed. The amount of sulphate of zinc formed as well as that of copper deposited are both directly proportional to the quantity of electricity traversing the circuit formed by the battery and the conductor uniting its poles. It has been found by experiment that the quantity of electricity or strength of current thus traversing the external circuit depends upon the specific gravity of the solution of sulphate of zinc surrounding the zinc or positive element of the battery. It has also been ascertained that the principal cause of the ultimate decline in the strength of current during long-continued action is the formation of an excess of sulphate of zinc. When the solution of sulphate of zinc approaches saturation, polarization takes place in the battery, in consequence of which the internal resistance of the battery is enormously increased, although the electro-motive force may remain the same. The best results are obtained in all cases when the liquid surrounding the copper plate is a saturated solution of sulphate of copper having a specific gravity of 1.18 and the zinc or positive element surrounded by a solution of sulphate of zinc having a specific gravity of 1.10, it being found that the zinc solution, when of a specific gravity of 1.10, offers its minimum resistance to the passage of the electric current. In order to maintain both these solutions continuously at the proper and desired degree of density, I provide devices which are automatically operated by the changes in the specific gravity of the respective solutions which are caused by the action of the battery itself. I effect the removal of the saturated zinc solution by means of a conduit, $h$, which has its uppermost or inlet opening placed in the lower part of said solution. This conduit is normally closed by a valve, H, which may consist of a hemispherical piece of vulcanized rubber. To this valve is attached a hollow float, F, which is weighted in order to keep it normally in place. A convenient method of weighting the float is to attach to it a shallow cup, G, in which may be placed small weights—such as shot or bits of metal—as shown at $g$. The valve H is preferably provided with a spindle or guide projecting downward within the conduit $h$, which prevents its lateral displacement.

A globe or reservoir, E, of any convenient form or dimensions, is fixed above the containing-vessel A, with its outlet or mouth placed just at the surface of the sulphate-of-zinc solution. Another similar reservoir, D, is also placed above the containing-vessel, having its discharge-orifice at the end of a tube extending downward into the immediate vicinity of the copper plate or element. The last-named reservoir is filled with a saturated solution of sulphate of copper, which may, if required, be maintained in a condition of saturation by introducing crystals of the salt through an opening, $d'$, at its top, which is ordinarily closed by a suitable stopper, as shown in the drawings.

The operation of the automatic feeding apparatus is as follows: When the battery has been charged and set in operation in the manner illustrated in Fig. 1, the valve H is normally kept closed by the weighted float F, and none of the solution can escape through the conduit $h$. The discharge-orifice of the reservoir E being at or just beneath the surface of the solution, the water contained in the latter is prevented from descending by the pressure of the atmosphere, the vessel being air-tight. When the specific gravity of the sulphate-of-zinc-solution has increased by the action of the battery to a certain predetermined amount, it becomes sufficient to raise the float F, together with the valve H, and thereby allow a portion of the solution to escape. As soon as the level of the surface of the solution has been sufficiently lowered by this means, bubbles of air will pass up into the reservoir E, displacing an equal volume of pure water, which will descend into the sulphate-of-zinc solution, diluting the same, and consequently reducing its specific gravity. This operation will continue until the normal specific gravity of the solution has been restored, when the float will descend and the valve will automatically close. The action of the float may be adjusted by placing a greater or less amount of weight in the pan G, and I prefer in practice that it should be so adjusted that the specific gravity of the zinc solution will not exceed 1.16.

The manner in which the liquid surrounding the copper plate is kept in a saturated condition is as follows: During the time that the battery is in action metallic copper is constantly being precipitated from the solution, reducing its strength, and consequently its specific gravity; hence an interchange of the solution is continually going on, the lighter portions ascending into the reservoir D and the saturated solution coming down to take its place in the lower part of the porous cell. This operation is kept up as long as a supply of saturated solution remains in the reservoir, and this may be calculated in accordance with the work to be done by the battery, so that a supply may last for any required length of time.

In the organization shown in Fig. 2, which represents a cell of the type ordinarily known as the "gravity-battery," the porous cup is dispensed with and the elements are placed horizontally one above the other, the positive or zinc element being uppermost. The mode of operation of the feeding apparatus in this case is substantially the same as already described. The saturated solution of sulphate of copper descends from the reservoir D and surrounds the copper plate C, the opening of the conduit $h$ being sufficiently elevated above the bottom of the containing-vessel to avoid any liability of drawing off the sulphate-of-copper solution. The sulphate-of-zinc solution is superposed upon the sulphate-of-copper solution, and remains in that position by virtue of its lesser specific gravity. Inasmuch as the action of the battery automatically maintains a proper relation between the respective specific gravities of the two solutions, they exhibit no tendency to become intermingled, while in the ordinary forms of batteries the specific gravity of the sulphate-of-zinc solution soon becomes greater than that of the sulphate-of-copper solution, which places them in a condition of unstable equilibrium, and ultimately causes them to intermingle throughout the cell, giving rise to excessive local action and a corresponding consumption of material without useful effect.

I claim as my invention—

1. In a voltaic battery, the combination, substantially as hereinbefore set forth, of a containing-vessel, a conduit whereby the solution may be withdrawn from the containing-vessel, a valve normally closing said conduit, and a float for automatically opening said valve when the specific gravity of the solution becomes abnormally great.

2. In a voltaic battery, the combination, substantially as hereinbefore set forth, of a containing-vessel, a conduit whereby the solution or a portion thereof may be withdrawn from said containing-vessel, a valve normally closing said conduit, a float for opening said valve, and means, substantially such as described, for adjusting the specific gravity of said float, whereby the valve is automatically opened when the solution reaches a predetermined density.

3. In a voltaic battery, the combination, substantially as hereinbefore set forth, of a containing-vessel within which the positive and negative elements of the battery are respectively immersed in solutions of normally unequal specific gravities, a conduit having its uppermost or inlet opening situated in the lower portion of the solution of least specific gravity, and a water-reservoir having its discharge-orifice situated at the normal level of the surface of the last-named solution, whereby the lower portion of said solution may be withdrawn when it becomes partially or wholly saturated, and automatically replaced by an equal volume of water.

4. In a voltaic battery, the combination, substantially as hereinbefore set forth, of a containing-vessel within which the positive and negative plates or elements are supported in different horizontal planes, a solution surrounding the lower plate having normally a greater specific gravity than the solution surrounding the upper plate, a conduit having its uppermost or inlet openings situated in a horizontal plane between the planes of the respective positive and negative plates, and a water-reservoir having its discharge-orifice situated at the normal level of the surface of the solution in the containing-vessel, whereby the lower portion of the uppermost solution may be withdrawn when it becomes partially or completely saturated, and automatically replaced by an equal volume of water.

5. In a voltaic battery, the combination, substantially as hereinbefore set forth, of a containing-vessel, a positive plate or element placed in the upper part and a negative plate or element placed in the lower part of said vessel, a solution surrounding the negative plate having normally a greater specific gravity than the solution surrounding the positive plate, a conduit having its uppermost or inlet opening situated in a horizontal plane between the planes of the respective positive and negative plates, and a water-reservoir having its discharge-orifice at the normal level of the surface of the solution surrounding the positive element, whereby the lower portion of said solution may be automatically withdrawn when it becomes partially or completely saturated, and replaced by an equal volume of water.

6. In a voltaic battery, the combination, substantially as hereinbefore set forth, of a containing-vessel, a positive plate or element placed in the upper part and a negative plate or element placed in the lower part of said vessel, a solution surrounding the negative plate having normally a greater specific gravity than the solution surrounding the positive plate, a water-reservoir having its discharge-orifice situated at the normal level of the surface of the solution surrounding the positive element, and a reservoir containing a supply of solution for exciting the negative plate, having its discharge-orifice in the immediate vicinity of said plate.

7. In a voltaic battery, the combination, substantially as hereinbefore set forth, of a containing-vessel within which the positive and negative elements of the battery are respectively immersed in solutions of normally unequal specific gravities, a conduit having its uppermost or inlet opening situated in the lower portion of the solution of least specific gravity, a water-reservoir having its discharge-orifice situated at the normal level of the surface of the last-named solution, and a reservoir containing a supply of solution for exciting the negative plate, having its discharge-orifice in the immediate vicinity of said plate, whereby the specific gravities of the respective solutions may be automatically rendered practically constant during the continuous operation of the battery.

8. In a voltaic battery, the combination, substantially as hereinbefore set forth, of a containing-vessel, a positive plate or element placed in the upper part and a negative plate or element placed in the lower part of said vessel, a solution surrounding the negative plate having normally a greater specific gravity than the solution surrounding the positive plate, a conduit having its uppermost or inlet opening situated in a horizontal plane between the planes of the respective positive and negative plates, a water-reservoir having its discharge-orifice at the normal level of the surface of the solution surrounding the positive element, and a reservoir containing a supply of solution for exciting the negative plate, having its discharge-orifice in the immediate vicinity of said plate, whereby the specific gravities of the respective solutions may be rendered practically constant during the continuous operation of the battery.

In testimony whereof I have hereunto subscribed my name this 13th day of February, A. D. 1883.

FRANK L. POPE.

Witnesses:
DANIEL W. EDGECOMB,
CHARLES A. TERRY.